US006888794B1

(12) United States Patent
Jovanovic et al.

(10) Patent No.: US 6,888,794 B1
(45) Date of Patent: May 3, 2005

(54) METHOD OF DATA RATE EXCHANGE FOR TRANSMISSIONS ACROSS A PACKET-BASED NETWORK

(75) Inventors: Slobodan Jovanovic, Bethesda, MD (US); Mehul Mehta, Potomac, MD (US); Zongyao Zhou, Gaithersburg, MD (US)

(73) Assignee: Nortel Networks Limited (CA)

( * ) Notice: Subject to any disclaimer, the term of this patent is extended or adjusted under 35 U.S.C. 154(b) by 670 days.

(21) Appl. No.: 09/709,576

(22) Filed: Nov. 13, 2000

Related U.S. Application Data

(60) Provisional application No. 60/211,821, filed on Jun. 15, 2000.

(51) Int. Cl.[7] .............................................. H04L 12/26
(52) U.S. Cl. ........................ 370/230; 370/282; 370/352; 370/395.2
(58) Field of Search ................................ 370/401, 410, 370/252, 278, 282, 285, 292, 293, 231, 299, 229, 230; 375/219, 220, 222; 379/88.13, 350

(56) References Cited

U.S. PATENT DOCUMENTS

| | | | |
|---|---|---|---|
| 6,243,373 B1 * | 6/2001 | Turock ........................ | 370/352 |
| 6,463,135 B2 * | 10/2002 | Abrishami et al. ..... | 379/100.01 |
| 6,480,585 B1 * | 11/2002 | Johnston ................ | 379/100.17 |
| 6,515,996 B1 * | 2/2003 | Tonnby et al. .............. | 370/401 |
| 6,549,587 B1 * | 4/2003 | Li .............................. | 375/326 |
| 6,757,367 B1 * | 6/2004 | Nicol ...................... | 379/90.01 |
| 6,771,763 B1 * | 8/2004 | Hagirahim et al. ......... | 379/219 |

* cited by examiner

*Primary Examiner*—Brian Nguyen
*Assistant Examiner*—Tri H. Phan
(74) *Attorney, Agent, or Firm*—Steubing McGuinness & Manaras LLP

(57) ABSTRACT

A method and apparatus for exchanging data rate information across a packet-based network, is presented herein. In accordance with an embodiment of the invention, a first and second communication device, configured to operate as data sources, sinks, or both, communicate with a first and second gateway mechanism, respectively. The first gateway mechanism receives data rate information from the first communication device to determine a first data signaling rate between the first communication device and the first gateway mechanism. Similarly, the second gateway mechanism receives data rate information from the second communication device to determine a second data signaling rate between the second communication device and the second gateway mechanism. The first gateway forwards data rate information containing the first data signaling rate to the second gateway mechanism and the second gateway mechanism forwards data rate information containing the second data signaling rate to the first gateway mechanism. The first communication device and the first gateway mechanism determine a maximum compatible source-to-sink data rate based on the first data signaling rate and the second data signaling rate received from the second gateway mechanism and the second communication device and the second gateway mechanism determine a maximum compatible source-to-sink data rate based on the second data signaling rate and the first data signaling rate received from the first gateway mechanism.

32 Claims, 3 Drawing Sheets

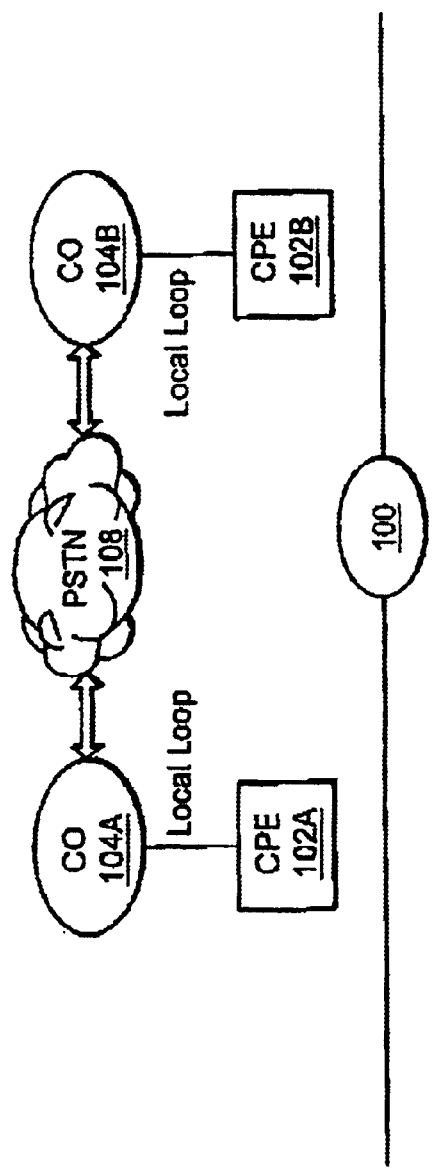
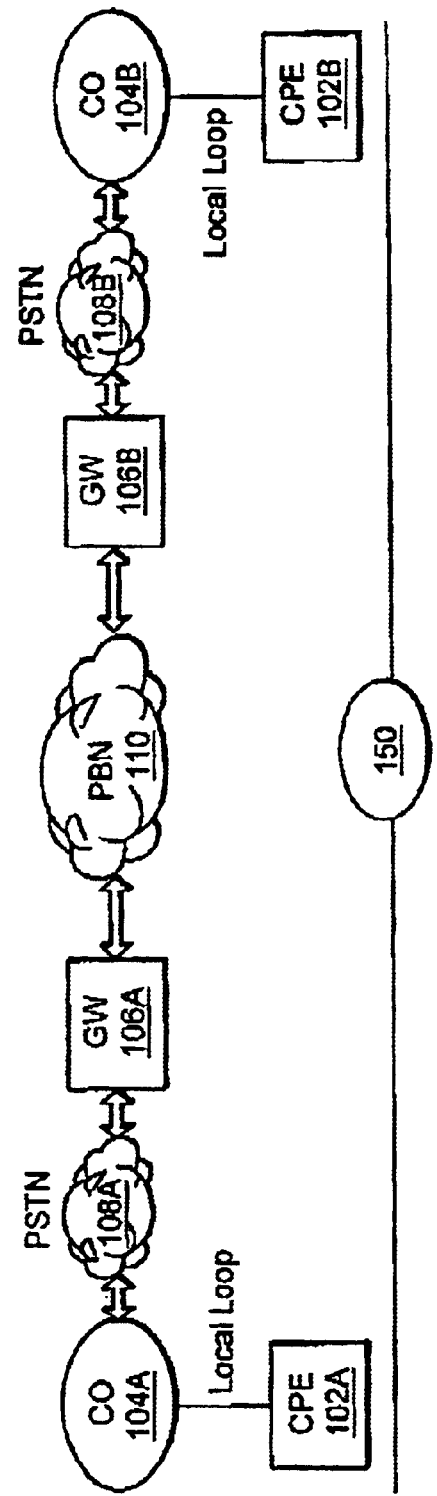
PRIOR ART
FIG. 1A
FIG. 1B

METHOD OF DATA RATE EXCHANGE FOR TRANSMISSIONS ACROSS A PACKET-BASED NETWORK

PRIORITY INFORMATION

The present application claims domestic priority, under 35 U.S.C. § 119(e), based on U.S. Provisional Application No. 60/211,821, filed by the same inventive entity, Jovanovic et al., on Jun. 15, 2000, entitled "Procedure for Data Rate Exchange of Data/Fax Transmission Across a Packet-Based Network."

BACKGROUND OF THE INVENTION

1. Field of the Invention

This invention generally relates to the field of data communication systems. More particularly, the invention presents an improved method for exchanging data rate information across a packet-based network.

2. Description of Related Art and General Background

With the unprecedented growth of the Internet, as well as the advances in computer technologies, the Public Switched Telephone Network (PSTN) has evolved into a main communication infrastructure for data traffic. Customer premise equipment (CPE) having communication capabilities, such as, for example, facsimile machines and modems, are now prevalent in both homes and offices. More often than not, CPEs rely on the PSTN infrastructure to provide connectivity to remote locations and support data traffic transport.

FIG. 1A depicts the conventional transport of data traffic across PSTN 108. As indicated in FIG. 1A, local CPE 102A and remote CPE 102B are respectively coupled by local access (i.e., local loop) to a telephone service provider's central switching office (CO) 104A, 104B. CPEs 102A, 102B are equipped with dial-up communication capabilities to initiate and establish connectivity. These capabilities operate in accordance with well-known communication protocols, such as, for example, ITU-T V series fax/data modem protocols, and in particular the V.34, Series V: *Data Communication Over the Telephone Network*, published in February 1998, the contents of which are herein expressly incorporated by reference. The V.34 protocol provides for the modulation, on-hook/off-hook, hand-shaking, and control signaling operations over PSTN 108.

Typically, a local CPE 102A initiates connectivity by dialing to remote CPE 102B, which accesses a switching mechanism in the local CO 104A. The local switching mechanism establishes an inter-office trunk connection to a remote switch in the remote CO 104B corresponding to the dialed remote CPE 102B. Upon achieving connectivity between the local CPE 102A and remote CPE 102B, a continuous, dedicated, circuit-switched, fixed channelized bandwidth is established for the duration of the call.

If the local and remote CPEs 102A, 102B are facsimile machines, the digital data scanned from the imaging portion is then modulated in an analog form suitable for transmission across the local loop wires and ultimately conveyed to the dialed facsimile machine. The transmission between the local CPE 102A and the remote CPE 102B operates in half-duplex mode. Similarly, if the local and remote CPEs 102A, 102B are modems, the digital data received from a connected computer is then modulated in an analog form suitable for transmission across the local loop wires and ultimately conveyed to the dialed modem. In such a case, the transmission between the local CPE 102A and the remote CPE 102B operates in full-duplex mode.

There are, however, drawbacks in the use of PSTN 108 to accommodate data traffic. For example, performance problems arise because data calls do not use the voice bandwidth efficiently. Data traffic tends to be bursty in nature and most of the time a data connection is not actually transmitting data it is simply reserving the connection in case it might use it. In addition, PSTN 108 was designed with the assumption that a relatively short call set-up time would be followed by a large amount of voice data being transferred. However, for data It transfers, the call set-up time in the PSTN 108 is very long relative to the length of the individual data transfers. This is exacerbated by the fact that, in order to minimize latency caused by call set-up times, most users leave their telephone connections off-hook for the entire time of the session, which may last several hours.

In an effort to alleviate some of these performance issues, telephone service providers 110 have developed Packet-Based Networks (PBN) on top of the PSTN 108 infrastructure to handle data traffic. FIG. 1B illustrates the conventional transport of data traffic across PBN 110.

As depicted in FIG. 1B, local CPE 102A and remote CPE 102B are respectively coupled by local access to local and remote COs 104A, 104B. In turn, local and remote COs 104A, 104B are coupled to local and remote gateway mechanisms (GWs) 106A, 106B, via PSTN 108A, 108B, respectively. Local and remote GWs 106A, 106B are configured to demodulate the analog data traffic received from the local and remote COs 104A, 104B into digital data and redirect the digital data to PBN 110.

Prior to conveying the digital data over the PBN 110, communication protocols, such as, for example, the aforementioned V.34 protocol, establish a local communications session between the local CPE 102A and local GW 106A and a remote communications session between the remote CPE 102B and remote GW 106B. In order to ensure proper operation and data transfer between the respective CPEs 102A, 102B and GWs 104A, 104B, these local and remote sessions include various handshaking, negotiation, and training procedures (e.g., V. 34 , Phase 2, Phase 3).

In particular, the V.34 protocol provides for the exchange of information sequences between the local CPE 102A and GW 106A and the remote CPE 102B and GW 106B during start-up, re-training, and re-negotiation sequences. These information sequences reflect the capabilities of, and the modulation parameters (e.g., MP, MPh sequences) supported by, the local and remote CPEs 102A, 102B and the local and remote GWs 104A, 104B. Embedded in the modulation parameter sequences, are the maximum data signaling rate supported by the local and remote CPEs 102A, 102B and the local and remote GWs 106A, 106B.

As such, prior to establishing the local and remote sessions, the maximum data signaling rates between the local CPE 102A and GW 106A and between the remote CPE 102B and GW 106B are exchanged and negotiated in order to determine the most suitable data signaling rates. There exists the possibility, however, that the most suitable data signaling rate between the local CPE 102A and GW 106A and the most suitable data signaling rate between the remote CPE 102B and GW 106B may be incompatible. At best, such incompatibility may result in sub-optimal data transmission performance. At worst, such incompatibility may result in the loss of data.

SUMMARY OF INVENTION

Methods and apparatuses consistent with the principles of the present invention, as embodied and broadly described herein, provide for a method of exchanging source-to-sink data rate information across a packet-based network. The method includes receiving, by a first gateway mechanism coupled to said network, data rate information from a first communication device that is configured to operate as a source, sink, or both. The method then determines a first data signaling rate between the first communication device and the first gateway mechanism. Similarly, a second gateway mechanism receives data rate information from a second communication device that is also configured as a source, sink, or both. The method then determines a second data signaling rate between the second communication device and the second gateway mechanism. The first gateway mechanism forwards the data rate information containing the first data signaling rate to the second gateway mechanism and the second gateway mechanism forwards the data rate information containing the second data signaling rate to the first gateway mechanism. The first communication device and the first gateway mechanism determine a maximum compatible source-to-sink data rate based on the first data signaling rate and the second data signaling rate received from the second gateway mechanism. The second communication device and the second gateway mechanism determine a maximum compatible source-to-sink data rate based on the second data signaling rate and the first data signaling rate received from the first gateway mechanism.

BRIEF DESCRIPTION OF THE DRAWINGS

FIG. 1A depicts a functional block diagram of a PSTN-based communication system.

FIG. 1B depicts a functional block diagram of a PBN-based communication system.

DETAILED DESCRIPTION OF THE INVENTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

Figure 2:
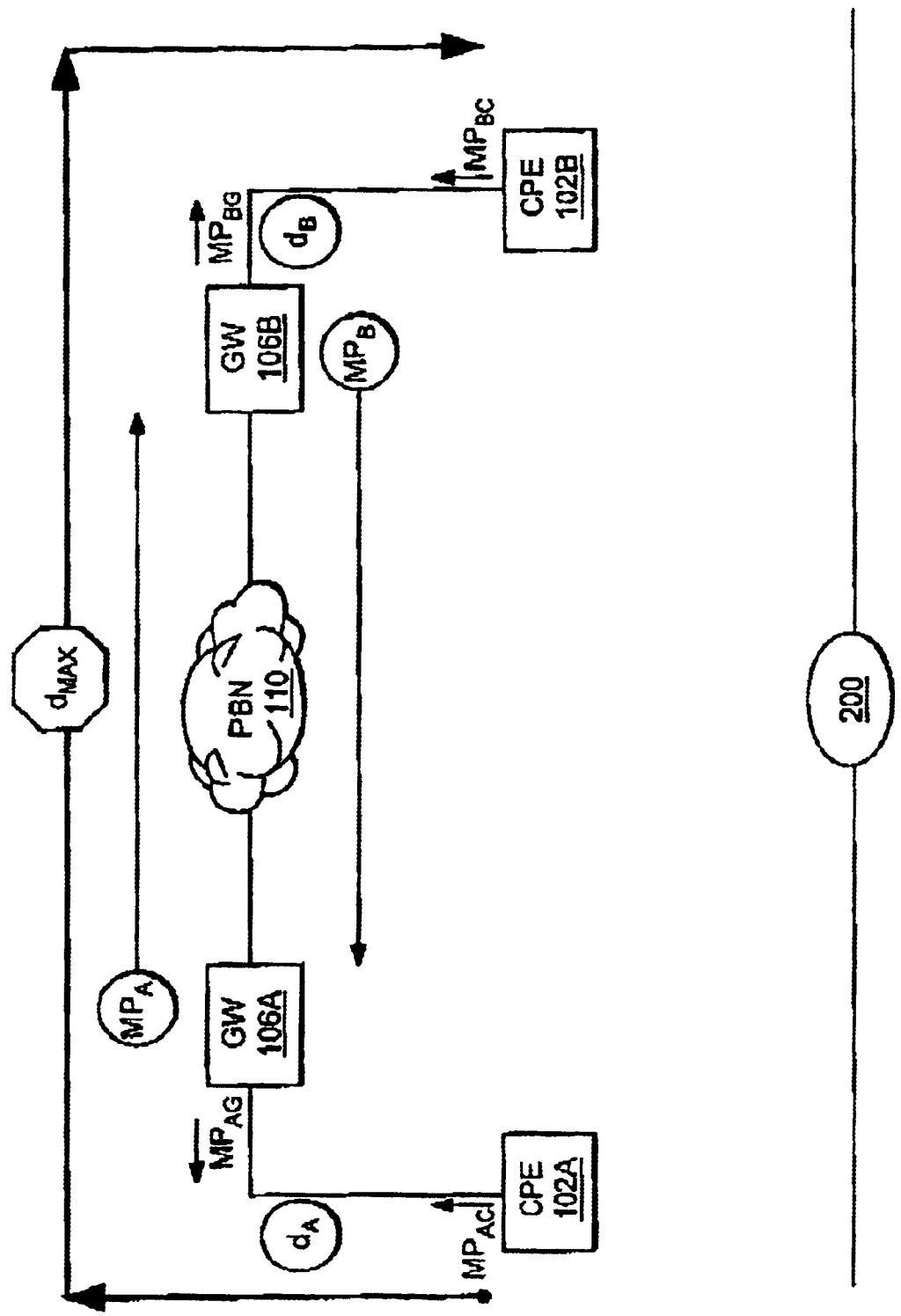
FIG. 2 depicts a signal flow diagram, constructed and operative in accordance with an embodiment of the present invention.

According to an embodiment of the present invention, as indicated in FIG. 2, a first (or local) communication device transmits modulation parameter information containing data signaling rate information to a first (or local) gateway mechanism. Similarly, a second (or remote) communication device transmits modulation parameter information containing data signaling rate information to a second (or remote) gateway mechanism. The data signaling rate information for both the first and second communication devices represents the source-to-sink data rate. After determining the compatible data rate with the first communication device, the first gateway mechanism accordingly transmits the modulation parameter information to the second gateway mechanism. Similarly, after determining the compatible data rate with the second communication device, the second gateway mechanism commensurately transmits the modulation parameter information to the first gateway mechanism.

Upon receiving the modulation parameter information from the second gateway mechanism, the first gateway mechanism determines the maximum compatible source-to-sink data rate and accordingly sends the modulation parameter information to the first communication device. The sent modulation parameter information will be used to determine a compatible data signaling rate that takes into consideration the capabilities of the first communication device, the first gateway mechanism, the second communication device, and the second gateway mechanism. In like fashion, after receiving the modulation parameter information from the first gateway mechanism, the second gateway mechanism determines the maximum compatible source-to-sink data rate and accordingly sends the modulation parameter information to the second communication device. The sent modulation parameter information will be used to determine a compatible data signaling rate that takes into account the capabilities of the second communication device, the second gateway mechanism, the first communication device, and the first gateway mechanism.

In this manner, the first and second gateway mechanisms are forced to wait until they receive modulation parameter information from each other before settling on a source-to-sink data rate. By doing so, the present invention ensures that a compatible source-to-sink data rate will be achieved between the first and second communication devices, thereby minimizing the possibility of lost data.

It is to be noted, that the terms "local" and "remote" will be used to simplify the foregoing description of the embodiments of the present invention. It will be appreciated that, because communication devices may transmit data in half- or full-duplex mode, use of the terms "local" and "remote" are not intended to infer half- or full-duplex operations unless expressly indicated otherwise.

Figure 3:
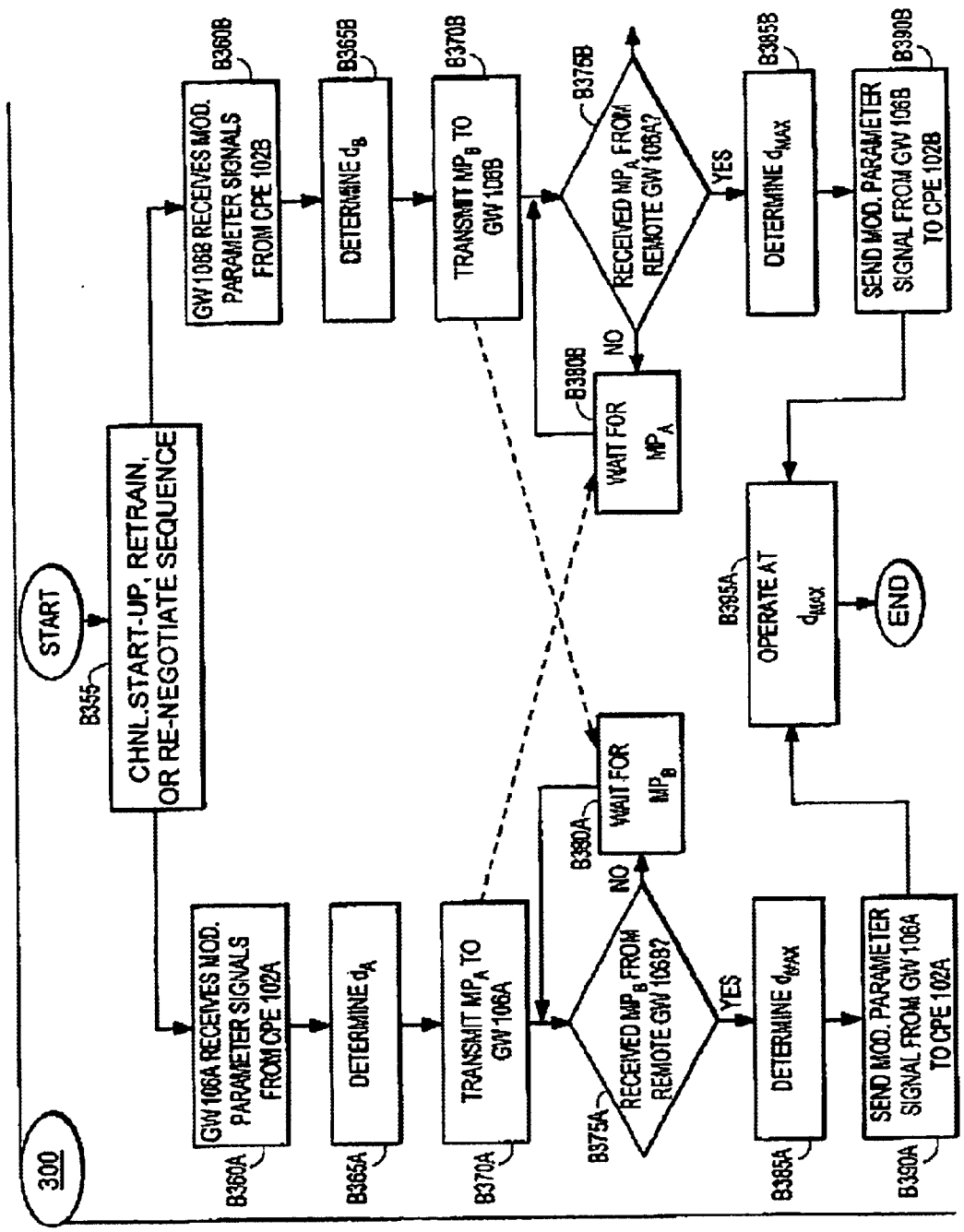
FIG. 3 depicts a flowchart, illustrating an example operation of an embodiment of the present invention.

FIG. 3 illustrates process 300, constructed to provide the exchange of data rate information across a packet-based network, in accordance with the present embodiment. As indicated in block B355, and in compliance with the V.34 protocol, the data signaling rates are negotiated during the start-up, retrain, and rate re-negotiation sequences. In block B360A, the local CPE 102A receives modulation parameter signals, indicative of the local data signaling rate information, from the local GW 106A. The local data signaling rate information includes information regarding the rates supported by the local CPE 102A. As noted in FIG. 2, the data signaling rate information from the local CPE 102A may be represented by $MP_{AC}$.

Similarly, in block B360B, the remote GW 106B receives modulation parameter signals, indicative of the remote data signaling rate information, from the remote CPE 102B. The remote data signaling rate information includes information regarding the rates supported by the remote CPE 102B. As noted in FIG. 2, the data signaling rate information from the remote CPE 102B may be represented by $MP_{BC}$.

In block B365A, process 300 determines a local data signaling rate $d_A$. Local data signaling rate $d_A$ represents the maximum local data signaling rate that may be supported by both the local CPE 102A and local GW 106A. Local data signaling rate $d_A$ may be captured and stored in local data signaling rate information $MP_A$. In like fashion, in block B365B, process 300 determines a remote data signaling rate $d_B$. Remote data signaling rate dB represents the maximum remote data signaling rate that may be supported by both the remote CPE 102B and remote GW 106B and may be captured and stored in remote data signaling rate information $MP_B$. The determination of data signaling rate dB may occur after the determination of data signaling rate $d_A$, although other interactions between the remote CPE 102B and remote GW 106B may be concurrent to the interactions between the local CPE 102B and local GW 106B In block B370A, process 300 directs the forwarding of $MP_A$ from the local GW 106A to the remote GW 106B As noted in FIG. 2, $MP_A$ is forwarded to remote GW 106B. This ensures that the remote CPE 102B and GW 106B possess data signaling rate information about the local CPE 102A and GW 106A, prior to establishing a compatible end-to-end data signaling rate. Similarly, in block B370B, process 300 directs the forwarding of $MP_B$ from the remote GW 106B to the local GW 106A. This ensures that the local CPE 102A and GW 106A possess data signaling rate information about the remote CPE 102B and GW 106B, prior to establishing a compatible data signaling rate.

In block B375A, process 300 determines whether local GW 106A has received the remote data signaling rate information $MP_B$ from remote GW 106B. If GW 106A has received $MP_B$, process 300 advances to block B385A. If GW 106A has not received $MP_B$, process 300, in block B380A, delays the further processing of GW 106A until GW 106A receives $MP_B$. Such delay may be achieved by implementing non-functional modulation parameter signals or similar innocuous transactional signals, until the receipt of $MP_B$ is confirmed by GW 106A.

Likewise, in block B375B, process 300 determines whether remote GW 106B has received the local data signaling rate information $MP_A$ from local GW 106A. If GW 106B has received $MP_A$, process 300 advances to block B385B. If GW 106B has not received $MP_A$, process 300, in block B380B, delays the further processing of GW 106B until GW 106B confirms the receipt of $MP_A$.

If local GW 106A has received $MP_B$, process 300, in block B385A, determines a maximum source-to-sink data signaling rate $d_{MAX}$ that is compatible with the remote data signaling rate $d_A$ as well as the received local data signaling rate $d_A$ included in $MP_B$. In like fashion, process 300, in block B385B, determines a maximum source-to-sink data signaling rate $d_{MAX}$ that is compatible with the remote data signaling rate $d_B$ as well as the received local data signaling rate $d_A$ included in $MP_A$. By doing so, process 300 ensures that the determined maximum source-to-sink data signaling rate ad is compatible at both ends of the packet-based network 110, thereby minimizing the possibility of lost data.

In block B390A, process 300 directs the local GW 106A to send modulation parameter information to the local CPE 102A. The modulation parameter information conveyed to the local CPE 102A includes $d_{MAX}$ as well as other information regarding the capabilities of local GW 106A (indicated by $MP_{AG}$ in FIG. 2) and remote CPE 102B (i.e., MPG). Similarly, process 300, in block B390B, directs the remote GW 106B to send modulation parameter information to the remote CPE 102B, which includes $d_{MAX}$ as well as local GW 106A (indicated by $MP_{BG}$ in FIG. 2) and remote CPE 102B (i.e., $MP_B$) capabilities.

Finally, in block B395, process 300 allows for data transfers to occur between the local PE 102A and remote CPE 102B at the maximum compatible source-to-sink data signaling rate $d_{MAX}$.

It will be appreciated that for half-duplex transmissions, such as in the case of CPEs 102A, 102B configured as facsimile machines, the maximum compatible source-to-sink data signaling rate $d_{MAX}$ achieved by process 300 may be used by both CPEs 102A, 102B. That is, during the time interval when CPE 102A operates as a source, CPE 102A transmits to CPE 102B at $d_{MAX}$ and during the time interval that CPE 102B operates as a source, CPE 102B transmits to CPE 102A at $d_{MAX}$.

It will also be appreciated that for full-duplex transmissions, such as in the case of CPEs 102A, 102B configured as modems, process 300 may be used to possibly determine two values for $d_{MAX}$ (i.e., $d_{MAXA}$ and $d_{MAXB}$). Because CPEs 102A, 102B both operate as sources and sinks concurrently during full-duplex operations, the maximum compatible source-to-sink data signaling rate $d_{MAX}$ when CPE 102A transmits to CPE 102B may be different than the maximum compatible source-to-sink data signaling rate $d_{MAX}$ when CPE 102B transmits to CPE 102A. As such, process 300 may be used to determine one value when CPE 102A transmits to CPE 102B (i.e., $d_{MAXA}$) and process 300 may be used to determine another value when CPE 102B transmits to CPE 102A (i.e., $d_{MAXB}$).

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein.

Moreover, the processes associated with the presented embodiments may be stored in any storage device, such as, for example, non-volatile memory, an optical disk, magnetic tape, or magnetic disk. Furthermore, the processes may be programmed when the system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by the system.

The foregoing description of the preferred embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed is:

1. A method for exchanging source-to-sink data rate information in a packet-based network, comprising:

receiving, by a first gateway mechanism coupled to said network, data rate information from a first communication device, said first communication device configured to operate as at least one of a source and sink;

determining a first data signaling rate between said first communication device and said first gateway mechanism;

receiving, by a second gateway mechanism coupled to said network, data rate information from a second communication device, said second communication device configured to operate as at least one of a source and sink;

determining a second data signaling rate between said second communication device and second gateway mechanism;

forwarding data rate information containing said first data signaling rate to said second gateway mechanism; and forwarding data rate information containing said second data signaling rate to said first gateway mechanism, wherein said first communication device and said first gateway mechanism determine a first maximum compatible source-to-sink data rate based on said first data signaling rate and said second data signaling rate received from said second gateway mechanism, and wherein said second communication device and said second gateway mechanism determine a second maximum compatible source-to-sink data rate based on said second data signaling rate and said first data signaling rate received from said first gateway mechanism; and wherein the first maximum compatible source-to-sink data rate and said second maximum compatible source-to-sink data rate differ.

2. The method of claim 1, wherein said first gateway mechanism implements a delay until it has received said data rate information containing said second data signaling rate from said second gateway mechanism.

3. The method of claim 2, wherein said second gateway mechanism implements a delay until it has received said data rate information containing said first data signaling rate from said first gateway mechanism.

4. The method of claim 3, wherein said first communication device and said first gateway mechanism determine said first maximum compatible source-to-sink data rate by selecting the maximum data rate supported by said first communication device, said first gateway mechanism, and said second data signaling rate and a mode of operation of said first communication device.

5. The method of claim 4, wherein said second communication device and said second gateway mechanism determine said second maximum compatible source-to-sink data rate by selecting the maximum data rate supported by said second communication device, said second gateway mechanism, and said first data signaling rate and a mode of operation of said second communication device.

6. The method of claim 5, wherein said data rate information is configured as a modulation parameter sequence in accordance with any of the V series fax/data modem protocols.

7. The method of claim 6, wherein said first gateway mechanism delay and said second gateway mechanism delay are implemented as a nonfunctional modulation parameter sequence.

8. The method of claim 7, wherein, for half-duplex transmissions, said first communication device transmits data to said second communication device at said first maximum compatible source-to-sink data rate during a first interval of time when said first communication device operates as said source, and wherein said second communication device transmits data to said first communication device at said second maximum compatible source-to-sink data rate during a second interval of time when said second communication device operates as said source.

9. The method of claim 8, wherein said first communication device and said second communication device are configured as facsimile machines operating in half-duplex transmission mode.

10. The method of claim 7, wherein, for full-duplex transmissions, said first communication device transmits data to said second communication device at said first maximum compatible source-to-sink data rate and said second communication device transmits data to said first communication device at said second maximum compatible source-to-sink data rate.

11. The method of claim 10, wherein said first communication device and said second communication device are configured as modems operating in full-duplex transmission mode.

12. An apparatus for exchanging source-to-sink data rate information in a packet-based network, comprising:

a first communication device configured to communicate data across said network and to operate as at least one of a source and sink of data;

a first gateway mechanism coupled to said network, said first gateway mechanism configured to receive data rate information from said first communication device to determine a first data signaling rate between said first communication device and said first gateway mechanism;

a second communication device configured to communicate data across said network and to operate as at least one of a source and sink of data;

a second gateway mechanism coupled to said network, said second gateway mechanism configured to receive data rate information from said second communication device to determine a second data signaling rate between said second communication device and said second gateway mechanism;

wherein said first gateway forwards data rate information containing said first data signaling rate to said second gateway mechanism and said second gateway mechanism forwards data rate information containing said second data signaling rate to said first gateway mechanism, and wherein said first communication device and said fist gateway mechanism determine a first maximum compatible source-to-sink data rate based on said first data signaling rate and said second data signaling rate received from said second gateway mechanism and said second communication device and said second gateway mechanism determine a second maximum compatible source-to-sink data rate based on said second data signaling rate and said first data signaling rate received from said first gateway mechanism, and wherein the first maximum compatible source-to-sink data rate and said second maximum compatible source-to-sink data rate differ.

13. The apparatus of claim 12, wherein said first gateway mechanism implements a delay until it has received said data rate information containing said second data signaling rate from said second gateway mechanism.

14. The apparatus of claim 13, wherein said second gateway mechanism implements a delay until it has received said data rate information containing said first data signaling rate from said first gateway mechanism.

15. The apparatus of claim 14, wherein said first communication device and said first gateway mechanism determine said first maximum compatible source-to-sink data rate by selecting the maximum data rate supported by said first communication device, said first gateway mechanism, and said second data signaling rate and a mode of operation of the first communication device.

16. The apparatus of claim 15, wherein said second communication device and said second gateway mechanism determine said second maximum compatible source-to-sink data rate by selecting the maximum data rate supported by said second communication device, said second gateway mechanism, and said first data signaling rate and a mode of operation of the second communication device.

17. The apparatus of claim 16, wherein said data rate information is configured as a modulation parameter sequence in accordance with any of the V series fax/data modem protocols.

18. The apparatus of claim 17, wherein said first gateway mechanism delay and said second gateway mechanism delay is implemented as a nonfunctional modulation parameter sequence.

19. The apparatus of claim 18, wherein, for half-duplex transmissions, said first communication device transmits data to said second communication device at said first maximum compatible source-to-sink data rate during a first interval of time when said first communication device operates as said source, and wherein said second communication device transmits data to said first communication device at said first maximum compatible sore-to-sink data rate during a second interval of time when said second communication device operates as said source.

20. The apparatus of claim 19, wherein said first communication device and said second communication device are configured as facsimile machines operating in half-duplex transmission mode.

21. The apparatus of claim 18, wherein, for full-duplex transmissions, said first communication device transmits data to said second communication device at said first maximum compatible source-to-sink data rate and said second communication device transmits data to said first communication device at said second maximum compatible source-to-sink data rate.

22. A machine-readable medium encoded with a plurality of processor-executable instruction sequences for exchanging data rate information in a packet-based network, said instruction sequences comprising:

receiving, by a first gateway mechanism coupled to said network, data rate information from a first communication device, said first communication device configured to operate as at least one of a source and sink;

determining a first data signaling rate between said first communication device and said first gateway mechanism;

receiving, by a second gateway mechanism coupled to said network, data rate information from a second communication device, said second communication device configured to operate as at least one of a source and sink;

determining a second data signaling rate between said second communication device and said second gateway mechanism;

forwarding data rate information containing said first data signaling rate to said second, gateway mechanism; and forwarding data rate information containing said second data signaling rate to said first gateway mechanism, wherein said first communication device and said first gateway mechanism determine a first maximum compatible source-to-sink data rate based on said first data signaling rate and said second data signaling rate received from said second gateway mechanism, and wherein said second communication device and said second gateway mechanism determine a first maximum compatible source-to-sink data rate based on said second data signaling rate and said first data signaling rate received from said first gateway mechanism; arm wherein the first maximum compatible source-to-sink data rate and said second maximum compatible source-to-sink data rate differ.

23. The machine-readable medium of claim 22, wherein said first gateway mechanism implements a delay until it has received said data rate information containing said second data signaling rate from said second gateway mechanism.

24. The machine-readable medium of claim 23, wherein said second gateway mechanism implements a delay until it has received said data rate information containing said first data signaling rate from said first gateway mechanism.

25. The machine-readable medium of claim 24, wherein said first communication device and said first gateway mechanism determine said first maximum compatible source-to-sink data rate by selecting the maximum data rate supported by said first communication device, said first gateway mechanism, and said second data signaling rate and a mode of operation of the first communication device.

26. The machine-readable medium of claim 25, wherein said second communication device and said second gateway mechanism determine said first maximum compatible source-to-sink data rate by selecting the maximum data rate supported by said second communication device, said second gateway mechanism, and said first data signaling rate and a mode of operation of the second communication device.

27. The machine-readable medium of claim 26, wherein said data rate information is configured as a modulation parameter sequence in accordance with any of the V series fax/data modem protocols.

28. The machine-readable medium of claim 27, wherein said first gateway mechanism delay and said second gateway mechanism delay are implemented as a nonfunctional modulation parameter sequence.

29. The machine-readable medium of claim 28, wherein, for half-duplex transmissions, said first communication device transmits data to said second communication device at said first maximum compatible source-to-sink data rate during a first interval of time when said first communication device operates as said source, and wherein said second communication device transmits data to said first communication device at said first maximum compatible source-to-sink data rate dung a second interval of time when said second communication device operates as said source.

30. The machine-readable medium of claim 29, wherein said first communication device and said second communication device are configure as facsimile machines operating in half-duplex transmission mode.

31. The method of claim 28, wherein, for full-duplex transmissions, said first communication device transmits data to said second communication device at said first maximum compatible source-to-sink data rate and said second communication device transmits data to said first communication device at said second maximum compatible source-to-sink data rate.

32. The machine-readable medium of claim 31, wherein said first communication device and said second communication device are configured as modems operating in full-duplex transmission mode.

* * * * *